(12) United States Patent
Feng et al.

(10) Patent No.: US 10,133,688 B2
(45) Date of Patent: Nov. 20, 2018

(54) METHOD AND APPARATUS FOR TRANSMITTING INFORMATION

(71) Applicant: Beijing Baidu Netcom Science and Technology Co., Ltd., Beijing (CN)

(72) Inventors: Jingchao Feng, Beijing (CN); Liming Xia, Beijing (CN); Quan Wang, Beijing (CN); Ning Qu, Beijing (CN); Zhuo Chen, Beijing (CN); Yu Ma, Beijing (CN); Haifeng Wang, Beijing (CN); Yibing Liang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 15/409,930

(22) Filed: Jan. 19, 2017

(65) Prior Publication Data

US 2018/0067878 A1    Mar. 8, 2018

(30) Foreign Application Priority Data

Sep. 7, 2016    (CN) .......................... 2016 1 0808299

(51) Int. Cl.
| | | |
|---|---|---|
| *G06F 12/00* | (2006.01) | |
| *G06F 13/16* | (2006.01) | |
| *G06F 12/02* | (2006.01) | |
| *G06F 12/1072* | (2016.01) | |

(52) U.S. Cl.
CPC ........ *G06F 13/1663* (2013.01); *G06F 12/023* (2013.01); *G06F 12/1072* (2013.01); *G06F 2212/1044* (2013.01)

(58) Field of Classification Search
CPC ............... G06F 13/1663; G06F 12/023; G06F 12/1072; G06F 2212/1044
See application file for complete search history.

(56) References Cited

U.S. PATENT DOCUMENTS 5,289,470 A * 2/1994 Chang ................... G06F 12/023
379/88.28
6,088,777 A * 7/2000 Sorber .................. G06F 12/023
370/381

FOREIGN PATENT DOCUMENTS

CN    102004675 A    4/2011
CN    102567225 A    7/2012

* cited by examiner

*Primary Examiner* — Kalpit Parikh
(74) *Attorney, Agent, or Firm* — Seed IP Law Group LLP (57) ABSTRACT

The present application discloses a method and an apparatus for transmitting information. A specific implementation of the method includes: sending first information to be transmitted to a shared memory; traversing memory groups in the shared memory, and acquiring a first memory unit suitable for the amount of the first information, each of the memory groups including at least one memory unit, each of memory units in the memory group having an identical size, and the memory units in different memory groups having different sizes; and storing the first information into the acquired first memory unit, so that the first information is read from the first memory unit by a receiving node. Through this implementation, the first information that needs to be transmitted is stored into the memory unit suitable for the amount of the first information, thereby saving memory resources.

15 Claims, 5 Drawing Sheets

METHOD AND APPARATUS FOR TRANSMITTING INFORMATION

CROSS-REFERENCE TO RELATED APPLICATION

This application claims the priority of Chinese Patent Application No. 201610808299.2, entitled "Method and Apparatus for Transmitting Information", filed on Sep. 7, 2016, the content of which is incorporated herein by reference in its entirety.

TECHNICAL FIELD

The present application relates to the field of computer technology, specifically to the field of computer application technology, and more specifically to a method and an apparatus for transmitting information.

BACKGROUND

Information can be transmitted between nodes in an operating system by a shared memory. Specifically, a sending node may store the information in the shared memory, and a receiving node reads the information from the shared memory unit, thus transmitting the information.

Generally, a memory unit in the shared memory that is used for storing the information needs to be initialized before the transmission of information. Because the amount of to-be-transmitted information cannot be determined, the system usually set the shared memory into a plurality of memory units of the same size. In order to store different amount of information, an additional space needs to be reserved in the memory unit, leading to waste of memory resources. When the amount of the to-be-transmitted information is greater than the size of each memory unit, the system further needs to recycle the memory unit, and to reallocate a memory unit matching the amount of the to-be-transmitted information. The processes of recycling and reallocating the memory unit waste a lot of time, leading to an increase in the delay during the information transmission, and affecting the efficiency of the information transmission.

SUMMARY

An objective of the present application is to provide an improved method and apparatus for transmitting information, in order to solve the technical problems mentioned in the Background section.

According to a first aspect, the present application provides a method for transmitting information, the method comprising: sending first information to be transmitted to a shared memory; traversing memory groups in the shared memory, and acquiring a first memory unit suitable for an amount of the first information, each of the memory groups comprising at least one memory unit, each of the memory units in the memory group having an identical size, and the memory units in different memory groups having different sizes; and storing the first information into the acquired first memory unit, so that the first information is read from the first memory unit by a receiving node.

In some embodiments, the shared memory is requested from an operating system, and the shared memory is divided into the memory groups and a reserved memory, wherein the sizes of the memory units are greater than a preset threshold.

In some embodiments, the memory groups comprise a static memory group and a dynamic memory group, the dynamic memory group comprising a single memory unit; and the size of the memory unit in the dynamic memory group is greater than the size of each of the memory units in the static memory group.

In some embodiments, the traversing memory groups in the shared memory, and acquiring a first memory unit suitable for the amount of the first information comprises: traversing the memory groups in the shared memory, and determining whether there is a memory unit having the size larger than the amount of the first information in each of the memory groups; and if yes, acquiring, from the memory units having the sizes larger than the amount of the first information, a memory unit having a smallest size difference with the amount of the first information as the first memory unit; and if no, reallocating a first memory unit suitable for the amount of the first information according to the reserved memory and an idle state of the memory unit in the dynamic memory group.

In some embodiments, the dividing the shared memory into a plurality of memory groups and a reserved memory comprises: dividing the shared memory into the memory groups and the reserved memory according to the amount of information received by the shared memory for the first time, the size of each memory unit in the memory groups being greater than the amount of the information received by the shared memory for the first time.

In some embodiments, the reallocating a first memory unit suitable for the amount of the first information according to the reserved memory and an idle state of the memory unit in the dynamic memory group comprises: determining whether the memory unit in the dynamic memory group is idle; and if yes, acquiring the memory unit in the dynamic memory group, recombining the memory unit and the reserved memory, and allocating the first memory unit suitable for the amount of the first information; and if no, deleting the memory unit in the dynamic memory group, and allocating, from the reserved memory, the first memory unit suitable for the amount of the first information.

According to a second aspect, the present application provides an apparatus for transmitting information, comprising: a sending module, configured to send first information to be transmitted to a shared memory; an acquiring module, configured to traverse memory groups in the shared memory, and acquire a first memory unit suitable for the amount of the first information, each of the memory groups comprising at least one memory unit, each of memory units in the memory group having an identical size, and memory units in different memory groups having different sizes; and a storing module, configured to store the acquired first information into the first memory unit, so that the first information is read from the first memory unit by a receiving node.

In some embodiments, the apparatus further comprises: a dividing module, configured to request the shared memory from an operating system, and divide the shared memory into the memory groups and a reserved memory, the sizes of the memory units being greater than a preset threshold.

In some embodiments, the memory groups comprise a static memory group and a dynamic memory group, the dynamic memory group comprising a single memory unit; and the size of the memory unit in the dynamic memory group is greater than the size of each of the memory units in the static memory group.

In some embodiments, the acquiring module comprises: a determining sub-module, configured to traverse the memory groups in the shared memory, and determine whether there is a memory unit having a size larger than the amount of the first information in each of the memory groups; and if yes, acquire, from the memory units having the sizes larger than the amount of the first information, a memory unit having a smallest size difference with the amount of the first information as the first memory unit; and if no, reallocate a first memory unit suitable for the amount of the first information according to the reserved memory and an idle state of the memory unit in the dynamic memory group.

In some embodiments, the dividing module is specifically configured to: divide the shared memory into the memory groups and the reserved memory according to the amount of information received by the shared memory for the first time, the size of each memory unit in the memory groups being greater than the amount of the information received by the shared memory for the first time.

In some embodiments, the determining sub-module is further configured to: determine whether the memory unit in the dynamic memory group is idle; and if yes, acquire the memory unit in the dynamic memory group, recombine the memory unit and the reserved memory, and allocate the first memory unit suitable for the amount of the first information; and if no, delete the memory unit in the dynamic memory group, and allocate, from the reserved memory, the first memory unit suitable for the amount of the first information.

According to the method for transmitting information provided by the present application, the first information to be transmitted is sent to the shared memory; and then, the memory groups in the shared memory are traversed, and the first memory unit suitable for the amount of the first information is acquired; and then, the first information is stored into the above-mentioned first memory unit; and finally, the first information is read from the above-mentioned first memory unit by a receiving node. The first information is stored into the first unit suitable for the amount of the first information, thereby reducing the memory waste and saving the memory resources.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

Figure 1:
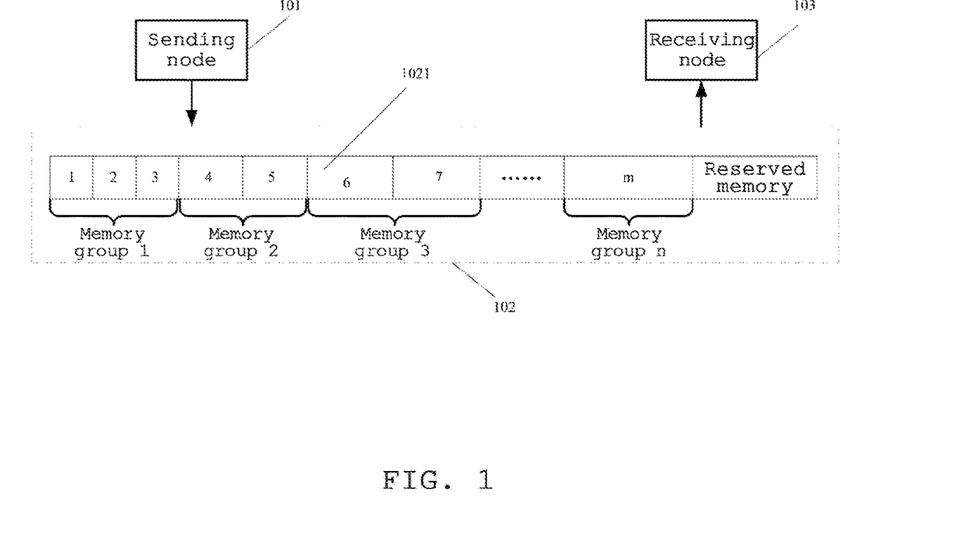
FIG. 1 is an architectural diagram of an exemplary operating system that can be applied to a method for transmitting information or apparatus according to an embodiment of the present application.

It should also be noted that the embodiments in the present application and the features in the embodiments may be combined with each other on a non-conflict basis. The present application will be described below in detail with reference to the accompanying drawings and in combination with the embodiments. FIG. 1 is an architectural diagram of an exemplary operating system 100 that can be applied to a method for transmitting information or apparatus according to an embodiment of the present application.

As shown in FIG. 1, the operating system 100 may include a sending node 101 used for sending information, a shared memory 102 used for storing the information, and a receiving node 103 used for reading the information, so that the operating system can transmit the information from the sending node 101 to the receiving node 103 by the shared memory. The operating system 100 herein may be, but not limited to, a Linux system, a robot operating system (ROS), and so on.

In the above-mentioned operating system 100, the sending node 101 may send to-be-transmitted information to the shared memory 102, and the receiving node 103 may read the information stored in the shared memory 102. A memory unit 1021 in the above-mentioned shared memory 102 may be used for storing the information sent from the sending node 101.

In the present application, the shared memory 102 may include a plurality of memory groups and a reserved memory. As shown in FIG. 1, the shared memory 102 includes n memory groups including a memory group 1, a memory group 2, etc., and one reserved memory. Each memory group may include at least one memory unit 1021. For example, the memory group 1 includes three memory units, and the memory group 2 includes two memory units, as shown in FIG. 1. The memory units 1021 in a same memory group have an identical size, and the memory units 1021 in different memory groups are of different sizes. Therefore, the above-mentioned shared memory 102 includes n types of memory units 1021 of different sizes.

Further, the memory groups in the above-mentioned shared memory 102 may include a static memory group and a dynamic memory group. For example, the memory group 1, the memory group 2, etc. are the static memory groups, and the memory group n is the dynamic memory group. Herein, the size of each memory unit 1021 in the static memory group is generally constant, and the memory unit 1021 in the dynamic memory group may be recombined with the reserved memory to allocate a memory unit of a preset size. Generally, the shared memory 102 may include a plurality of static memory groups and one dynamic memory group, wherein the dynamic memory group includes a single memory unit. When the amount of the to-be-transmitted information is greater than the sizes of all the memory units 1021, the memory units 1021 in the dynamic memory group may be combined with the reserved memory to reallocate a memory unit suitable for the amount of the to-be-transmitted information, and to store the to-be-transmitted information into the reallocated memory unit.

The memory units 1021 in the above-mentioned shared memory 102 may each have a unique serial number. For example, as shown in FIG. 1, the memory units 1021 may be sequentially numbered as 1, 2, and so on. When the sending node 101 sends the to-be-transmitted information to the shared memory 102, the memory units 1021 may be checked sequentially according to the serial numbers, and the memory units 1021 whose size is greater than the amount of the above-mentioned to-be-transmitted information are acquired. Then, a difference between the size of each of the acquired memory units 1021 and the amount of the above-mentioned to-be-transmitted information is calculated. Finally, the to-be-transmitted information may be stored into the memory unit 1021 having a smallest size difference from the amount of the above-mentioned to-be-transmitted information. It should be noted that if there is no memory unit 1021 larger than the to-be-transmitted information in the shared memory 102, a memory unit m in the dynamic memory group n is combined with the reserved memory to be reallocated, the allocated memory unit is renumbered m, and the to-be-transmitted information is stored into the memory unit.

In the above-mentioned shared memory 102, as the serial numbers of the memory units 1021 increase, the sizes of the memory units 1021 in the different memory groups may increase in sequence, as shown in FIG. 1. For example, if the size of the memory unit 1 in the memory group 1 is a, the size of a memory unit 4 in the memory group 2 is b, the size of a memory unit 6 in the memory group 3 is c, and the size of the memory unit m in the memory group n is d, the serial numbers of the memory units in the memory groups increase in sequence, and a<b<c<d. For example, the size of the memory unit 1 is smaller than that of the memory unit 4, the size of the memory unit 4 is smaller than that of the memory unit 6, and the size of the memory unit 6 is smaller than that of the memory unit m, that is, the sizes of the memory units 1021 in the different memory groups increase in sequence. In this case, when the sending node 101 sequentially queries for and obtains a plurality of memory units 1021 larger than the amount of the to-be-transmitted information according to the serial numbers, the memory unit with the smallest serial number is the memory unit having the smallest size difference with the amount of the above-mentioned to-be-transmitted information without determining the differences between the amount of the to-be-transmitted information and the sizes of the acquired memory units.

The above-mentioned receiving node 103 may map the above-mentioned shared memory to a space therein, so that the receiving node 103 may read the information stored in the shared memory 102 by accessing its own memory, thus finally implementing the information transmission between the sending node 101 and the receiving node 103.

It should be appreciated that the number of the sending nodes 101 and the number of the receiving nodes 103 in FIG. 1 are merely exemplary. The above-mentioned operating system 100 may have any number of the sending nodes 101 and the receiving nodes 103 according to implementation requirements.

Figure 2:
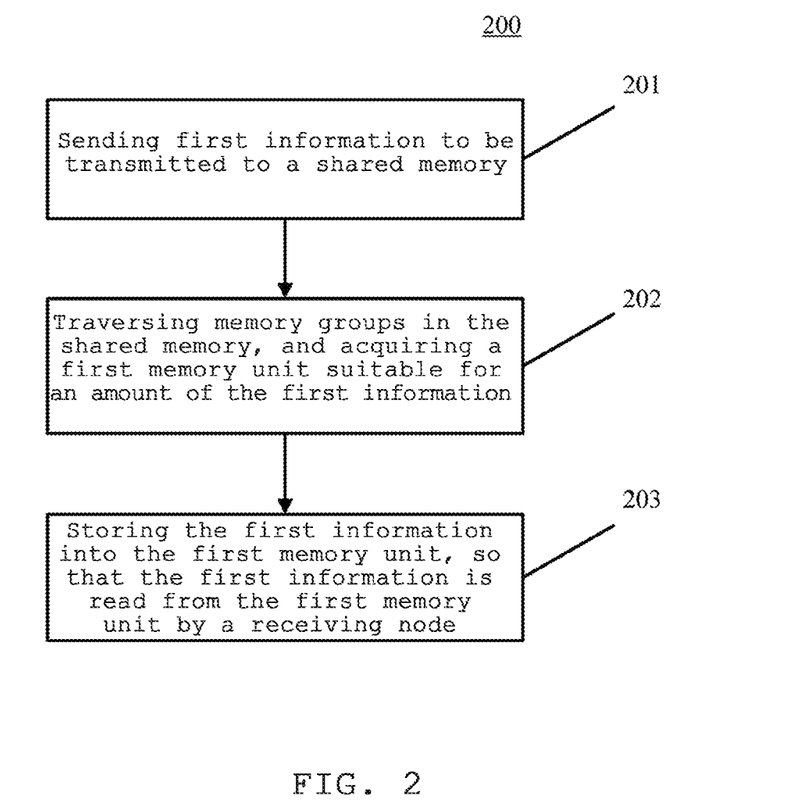
FIG. 2 is a flow chart of a method for transmitting information according to an embodiment of the present application.

FIG. 2 is a flow chart of a method for transmitting information 200 according to an embodiment of the present application. The information transmission method of this embodiment includes the following steps:

At Step 201, first information to be transmitted is sent to a shared memory.

In this embodiment, the sending node may be a node in the operating system that is used for sending information, and the above-mentioned operating system may be various operating systems, such as a Linux system and a robot operating system (ROS). The above-mentioned first information may be information that can be transmitted between the nodes in the operating system, and for example, may be road condition information during a simulation of a simulator of autonomous driving vehicles. The above-mentioned shared memory refers to a memory in a computer system that can be accessed by different nodes. The above-mentioned sending node may send the to-be-transmitted first information to the shared memory. It should be appreciated that the sending node may request the above-mentioned shared memory from the operating system.

At step 202, the memory groups are traversed in the shared memory, and a first memory unit suitable for the amount of the first information is acquired.

In this embodiment, the above-mentioned receiving node may obtain the amount of the first information firstly; and then traverse the memory groups in the shared memory, and acquire the first memory unit suitable for the amount of the above-mentioned information from the memory units in the memory groups.

It should be noted that the above-mentioned shared memory may include a plurality of memory groups, and each memory group includes at least one memory unit. Further, memory units in the same memory group are of the same size, and the memory units in the different memory groups are of different sizes. It can be seen that the above-mentioned shared memory may include a variety of the memory units having various storage capacities, so that the receiving node can acquire therefrom the first memory unit suitable for the amount of the first information. Generally, the size of the above-mentioned acquired first memory unit used for storing the first information may be slightly greater than the amount of the first information, so that the first memory unit can store the first information sent by the sending node.

At step 203, the first information is stored into the first memory unit, so that a receiving node reads the first information from the first memory unit.

In this embodiment, based on the first unit acquired at step 202, the sending node stores the above-mentioned to-be-transmitted first information into the above-mentioned first unit, so that the receiving node can read the above-mentioned first information, thereby implementing information transmission. The first information herein may be any piece of to-be-transmitted information in the operating system. The above-mentioned receiving node may be a node in the operating system that is used for receiving or reading the first information sent by the above-mentioned sending node, and for example, may be a node where each simulation module in the simulator for autonomous driving vehicles is located.

The above-mentioned receiving node may map the above-mentioned shared memory to its own memory, so that the receiving node can read the first information stored in the above-mentioned shared memory from its own memory, thereby implementing the transmission of information from the sending node to the receiving node.

According to the information transmission method provided in the above-mentioned embodiment of the present application, the shared memory may be divided into a plurality of memory groups, and the memory units in different memory groups are of different sizes, so that the shared memory may include the memory units of various sizes, and a memory unit suitable for the amount of the to-be-transmitted first information can be selected, thereby avoiding the waste of memory.

Figure 3:
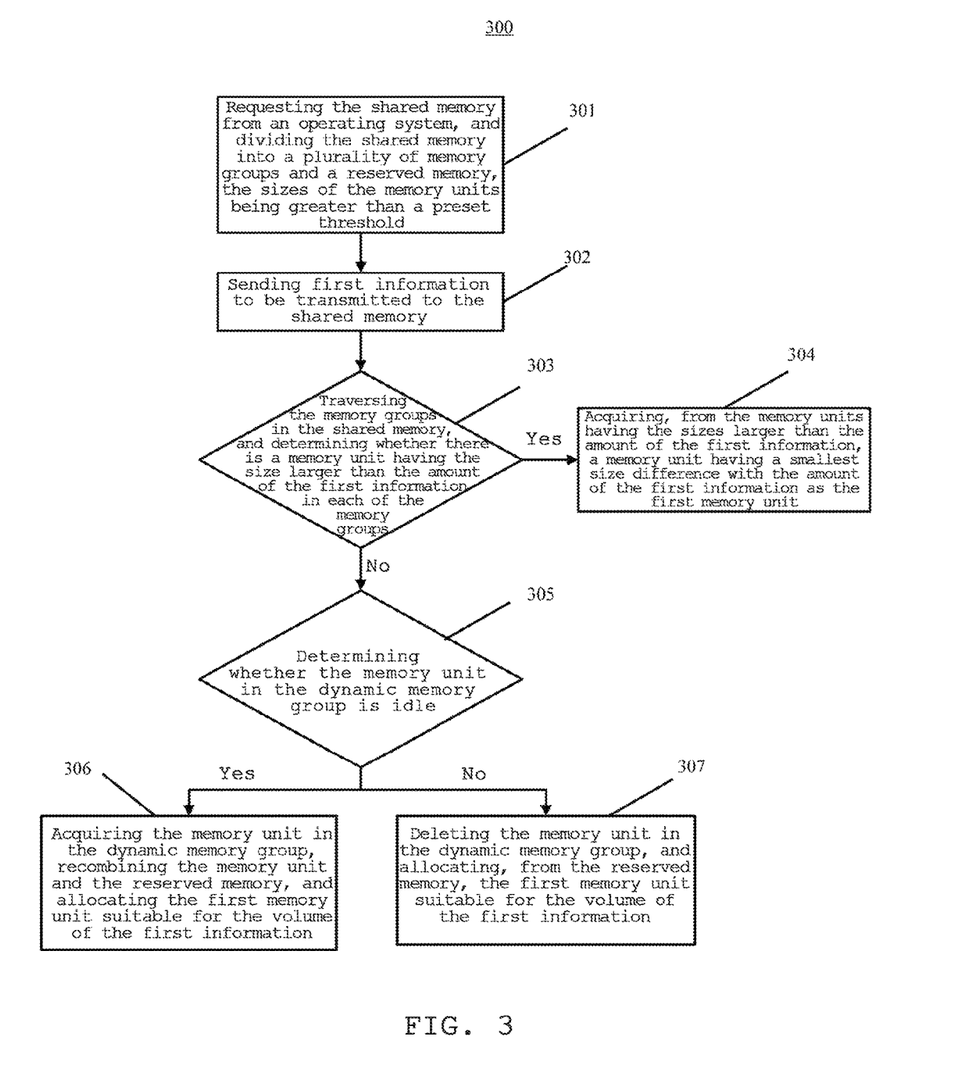
FIG. 3 is a flow chart of a method for transmitting information according to another embodiment of the present application.

Further, referring to FIG. 3, FIG. 3 shows a flow chart 300 of a method for transmitting information according to another embodiment of the present application. The information transmission method of this embodiment includes the following steps.

At step 301, the shared memory is requested from the operating system, and the shared memory is divided into a plurality of memory groups and a reserved memory, wherein the sizes of memory units is greater than a preset threshold.

In this embodiment, the sending node may be a node in the operating system that is used for sending information, and the above-mentioned operating system may be various operating systems, such as a Linux system, a robot operating system (ROS) and so on. The above-mentioned shared memory refers to a memory in a computer system that can be accessed by different nodes. The above-mentioned sending node may send the to-be-transmitted first information to the shared memory. It should be appreciated that the sending node may request the above-mentioned shared memory from the operating system.

After obtaining the shared memory allocated by the operating system, the sending node may divide the shared memory into a plurality of memory groups and a reserved memory. Each memory group may include at least one memory unit, the memory units in the same memory group are of the same size, and the memory units in different memory groups are of different sizes. It should be noted that the sizes of the memory units in the shared memory are all greater than the preset threshold. For example, when the preset threshold is 2M, and the shared memory includes a memory group 1, a memory group 2, a memory group 3, etc., the memory units in the memory group 1, the memory group 2, the memory group 3, etc. all have a storage space of greater than 2M. The memory units in any memory group are of a different size from that of the memory units in another memory group.

In some optional implementations of this embodiment, the above-mentioned sending node may divide the shared memory into the memory groups and the reserved memory according to the amount of the information received by the shared memory for the first time, so that the size of the smallest memory unit is greater than the amount of the information received by the above-mentioned shared memory for the first time. That is, the above-mentioned preset threshold is the amount of the information received by the shared memory. It should be appreciated that the above-mentioned preset threshold may also be set according to an average value of the amount of the historically transmitted information, and the minimum size of the memory units in the above-mentioned shared memory is not specifically limited.

In some optional implementations of this embodiment, the above-mentioned memory group may include a plurality of static memory groups and one dynamic memory group. After the sending node divides the shared memory, the memory units in the static memory groups will not be reallocated, and the memory unit in the dynamic memory group may be combined with the above-mentioned reserved memory to be reallocated. Further, the above-mentioned dynamic memory group may include a single memory unit, and the size of the memory unit in the above-mentioned dynamic memory group may be greater than the sizes of the memory units in the static memory groups. After sending the first information to the shared memory, the above-mentioned sending node may traverse the memory units and acquire the memory unit suitable for the amount of the above-mentioned first information. If the sizes of the memory units in the memory groups are all smaller than the amount of the above-mentioned first information, the memory unit in the dynamic memory group may be combined with the reserved memory and a memory unit suitable for the amount of the above-mentioned first information is reallocated, and the memory unit may be used to replace the memory unit in the original dynamic memory group.

At step 302, the to-be-transmitted first information is sent to the shared memory.

In this embodiment, the above-mentioned sending node may send the to-be-transmitted first information to the above-mentioned shared memory. The above-mentioned first information may be information that can be transmitted between nodes in the operating system, and for example, may be road condition information during simulation of a simulator for autonomous driving vehicles. It should be appreciated that the above-mentioned sending node may further acquire the amount of the to-be-transmitted first information, so as to query the shared memory for memory units that can be used for storing the above-mentioned first information.

At step 303, the memory groups are traversed in the shared memory, and whether there is a memory unit larger than the first information in the memory groups is determined.

In this embodiment, the above-mentioned sending node traverses the static memory groups and the dynamic memory group in the above-mentioned shared memory according to the amount of the first information, and queries the memory groups for the memory units larger than the above-mentioned first information. If there is the memory unit larger than above-mentioned first information in the memory groups, go to step 304; and if there is no memory unit larger than above-mentioned first information in the memory groups, go to step 305.

At step 304, a memory unit having the smallest size difference with the amount of the first information is acquired from the memory units larger than the first information as a first memory unit.

In this embodiment, when it is determined at step 303 that there is a memory unit larger than above-mentioned first information in the shared memory, the sending node further acquires, from the determined memory units larger than the above-mentioned first information, a memory unit having the smallest size difference with the amount of the above-mentioned first information, wherein the memory unit is used as a first memory unit used for storing the above-mentioned first information. If there is only one memory unit larger than above-mentioned first information in the above-mentioned shared memory, the memory unit may be directly used as the first memory unit for storing the first information without calculating the difference between the size of the memory unit and the amount of the above-mentioned first information.

In some optional implementations of this embodiment, the memory units in the above-mentioned shared memory may each have a unique serial number, and as the serial numbers of the memory units increase, the sizes of memory units in different memory groups may increase in sequence. The above-mentioned sending node may sequentially query for the memory units larger than the first information according to the order of serial numbers. In this case, if there is a memory unit larger than the above-mentioned first information in the shared memory, the memory unit with the smallest serial number is the memory unit having a smallest size difference with the amount of the above-mentioned to-be-transmitted information without determining the differences between the amount of the to-be-transmitted information and the sizes of the acquired memory units, thereby improving the efficiency of information transmission.

At step 305, whether the memory unit in the dynamic memory group is idle is determined.

In this embodiment, when it is determined at step 303 that there is no memory unit larger than above-mentioned first information in the shared memory, it may be determined that a first memory unit suitable for the amount of the above-mentioned first information needs to be reallocated in the above-mentioned shared memory to store the above-mentioned first information. The above-mentioned sending node may further determine whether the memory unit in the above-mentioned dynamic memory group is idle. If the memory unit in the above-mentioned dynamic memory group is idle, go to step 306; and if the memory unit in the above-mentioned dynamic memory group already stores information, go to step 307.

At step 306, the memory unit in the dynamic memory group is acquired, the memory unit and the reserved memory are recombined, and the first memory unit suitable for the amount of the first information is allocated.

In this embodiment, when it is determined at step 305 that the memory unit in the dynamic memory group is idle, the memory unit in the dynamic memory group may be combined with the reserved memory and the memory unit suitable for the amount of the above-mentioned first information is reallocated as the first memory unit, and then the above-mentioned first information is stored into the first memory unit. It should be noted that the reallocated first memory unit may be used to replace the memory unit in the above-mentioned dynamic memory group.

At step 307, the memory unit in the dynamic memory group is deleted, and the first memory unit suitable for the amount of the first information is allocated from the reserved memory.

In this embodiment, when it is determined at step 305 that the memory unit in the dynamic memory group already stores the information, the memory unit may be deleted, then the memory unit suitable for the amount of the above-mentioned first information is reallocated in the above-mentioned reserved memory as the first memory unit according to the amount of the above-mentioned first information, and finally the above-mentioned first information is stored into the first memory unit. It should be noted that the reallocated first memory unit may be used to replace the memory unit in the above-mentioned dynamic memory group.

It can be seen from FIG. 3 that compared with the embodiment of FIG. 2, the flow 300 of the information transmission method in this embodiment highlights the step of combining the dynamic memory group with the reserved memory and reallocating. Therefore, through the solution of this embodiment of the present application, when there is a memory unit larger than the above-mentioned first information in the shared memory, the first information can be stored into the first memory unit suitable for the amount of the first information; and when there is no memory unit larger than the first information in the shared memory, the memory unit in the above-mentioned dynamic memory group may be combined with the above-mentioned reserved memory and the memory unit suitable for the amount of the above-mentioned to-be-transmitted information is reallocated, thereby saving the memory resources, avoiding frequent recycling and reallocation of the memory units, and improving the efficiency of information transmission.

Figure 4:
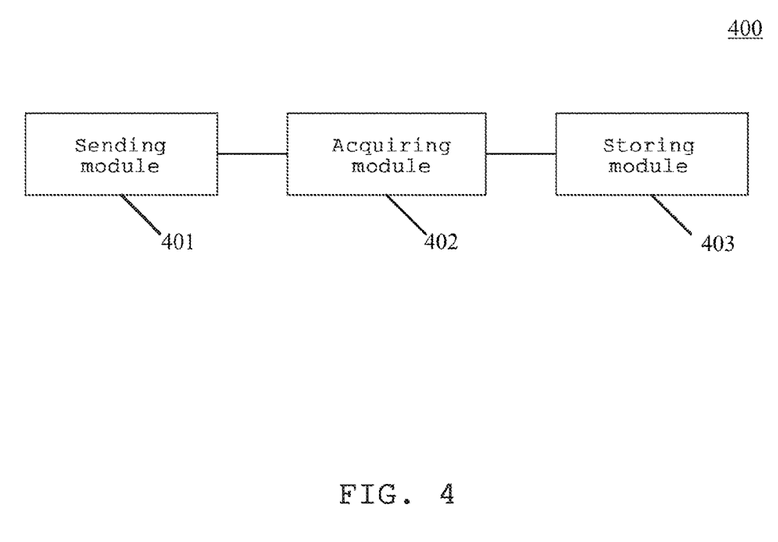
FIG. 4 is a schematic structural diagram of an apparatus for transmitting information according to an embodiment of the present application.

Further, referring to FIG. 4, as an implementation of the methods shown in the above-mentioned figures, the present application provides an embodiment of an apparatus for transmitting information. This apparatus embodiment corresponds to the method embodiment shown in FIG. 2. The apparatus may be specifically applied to various electronic devices.

As shown in FIG. 4, the information transmission apparatus 400 of this embodiment includes: a sending module 401, an acquiring module 402, and a storing module 403. The sending module 401 is configured to send to-be-transmitted first information to a shared memory. The acquiring module 402 is configured to traverse memory groups in the above-mentioned shared memory, and acquire a first memory unit suitable for the amount of the above-mentioned first information, wherein each of the memory groups includes at least one memory unit, each of the memory units in the memory group has an identical size, and the memory units in different memory groups have different sizes. The storing module 403 is configured to store the above-mentioned first information into the above-mentioned first memory unit, so that a receiving node reads the first information from the above-mentioned first memory unit.

In this embodiment, the information transmission apparatus 400 may send the to-be-transmitted first information to the shared memory, then traverse the memory groups in the above-mentioned shared memory and acquire the first memory unit suitable for the amount of the above-mentioned first information from the memory groups, and finally store the above-mentioned first information into the above-mentioned first memory unit; and the receiving node reads the first information from the first memory unit. The shared memory herein may include a plurality of memory groups and a reserved memory, each memory group includes at least one memory unit, each of the memory units in the memory group has an identical size, and the memory units in different memory groups have different sizes. Therefore, the shared memory includes a plurality of memory units of different sizes to store the to-be-transmitted information of different amounts, thereby avoiding the waste of memory resources.

In this embodiment, the information transmission apparatus 400 includes a dividing module, which is configured to request the above-mentioned shared memory from an operating system, and divide the above-mentioned shared memory into a plurality of memory groups and a reserved memory, wherein the size of each memory unit is greater than a preset threshold. The memory groups include a static memory group and a dynamic memory group, and the dynamic memory group includes a single memory unit. The size of the memory unit in the above-mentioned dynamic memory group is greater than the size of the memory units in the above-mentioned static memory group.

In this embodiment, the above-mentioned dividing module is specifically configured to divide the shared memory into the plurality of memory groups and the reserved memory according to the amount of information received by the above-mentioned shared memory for the first time, and the size of each memory unit in the memory groups is greater than the amount of the information received by the above-mentioned shared memory for the first time.

In this embodiment, the acquiring module 403 further includes a determining sub-module which is configured to traverse the memory groups in the above-mentioned shared memory, and determine whether there is a memory unit having a size larger than the amount of the above-mentioned first information in the memory groups; and if yes, acquire, from the memory units larger than the above-mentioned first information, a memory unit having a smallest size difference with the amount of the first information as the first memory unit; or if no, reallocate a first memory unit suitable for the amount of the above-mentioned first information according to the above-mentioned reserved memory and an idle state of the memory unit in the dynamic memory group. When there is a memory unit larger than the above-mentioned first information in the shared memory, the first information is stored into the first memory unit suitable for the amount of the first information; and when there is no memory unit larger than the first information in the shared memory, the memory unit in the above-mentioned dynamic memory group may be combined with the above-mentioned reserved memory and the memory unit suitable for the amount of the above-mentioned to-be-transmitted information is reallocated, thereby saving memory resources, avoiding frequent recycling and reallocation of memory units, and improving the efficiency of information transmission.

In this embodiment, the above-mentioned determining sub-module is further configured to: determine whether the memory unit in the above-mentioned dynamic memory group is idle; and if yes, acquire the memory unit in the above-mentioned dynamic memory group, recombine the memory unit and the above-mentioned reserved memory, and allocate the first memory unit suitable for the amount of the above-mentioned first information; and if no, delete the memory unit in the above-mentioned dynamic memory group, and allocate the first memory unit suitable for the amount of the above-mentioned first information from the above-mentioned reserved memory.

According to the information transmission apparatus provided in the above-mentioned embodiment of the present application, the to-be-transmitted first information may be stored into the memory unit whose size is greater than the amount of the first information and has the smallest size difference with the amount of the above-mentioned first information in the shared memory. When there is no memory unit larger than the first information in the shared memory, the memory unit in the above-mentioned dynamic memory group may be combined with the above-mentioned reserved memory and the memory unit suitable for the amount of the above-mentioned to-be-transmitted information is reallocated, thereby saving memory resources, avoiding frequent recycling and reallocation of memory units, and improving the efficiency of information transmission.

Figure 5:
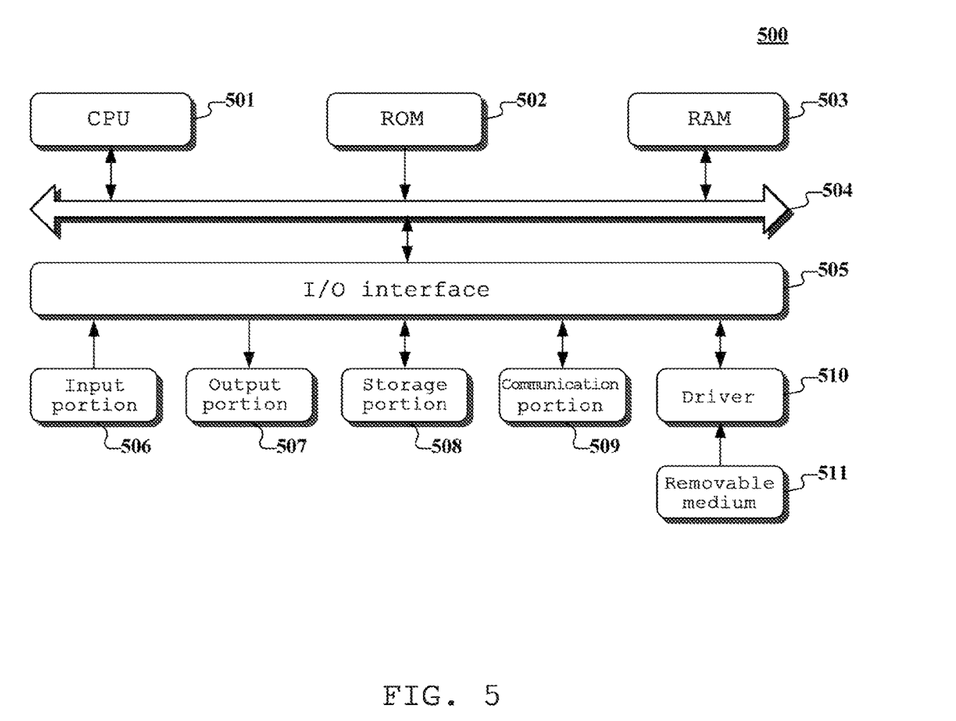
FIG. 5 is a schematic structural diagram of a computer system adapted to implement an apparatus for transmitting information according to an embodiment of the present application.

Referring to FIG. 5, a schematic structural diagram of a computer system 500 adapted to implement an apparatus for transmitting information of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a sending unit, an acquiring unit and a storing unit, where the names of these units or modules are not considered as a limitation to the units or modules. For example, the sending unit may also be described as "a unit for sending first information to be transmitted to a shared memory".

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs are executed by one device so that the device sends first information to be transmitted to a shared memory; traverse memory groups in the shared memory, and acquires a first memory unit suitable for an amount of the first information, wherein each of the memory groups comprises at least one memory unit, each of the memory units in the memory group has an identical size, and memory units in different memory groups have different sizes; and stores the first information into the acquired first memory unit, so that the first information is read from the first memory unit by a receiving node.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for transmitting information, comprising:
    requesting a shared memory from an operating system;
    dividing the shared memory into memory groups and a reserved memory;
    sending first information to be transmitted to the shared memory;
    traversing the memory groups in the shared memory, and acquiring a first memory unit suitable for an amount of the first information, the memory groups comprising a static memory group and a dynamic memory group, each of the memory groups comprising at least one memory unit, each of the memory units in the memory group having an identical size, and the memory units in different memory groups having different sizes; and
    storing the first information into the acquired first memory unit, so that the first information is read from the first memory unit by a receiving node,
    wherein the traversing memory groups in the shared memory, and acquiring a first memory unit suitable for the amount of the first information comprises:
    traversing the memory groups in the shared memory, and determining whether there is a memory unit having the size larger than the amount of the first information in each of the memory groups; and
    if yes, acquiring, from the memory units having the sizes larger than the amount of the first information, a memory unit having a smallest size difference with the amount of the first information as the first memory unit; and
    if no, reallocating a first memory unit suitable for the amount of the first information according to the reserved memory and an idle state of the memory unit in the dynamic memory group.

2. The method according to claim 1, wherein:
    the sizes of the memory units being greater than a preset threshold.

3. The method according to claim 2, wherein the dynamic memory group comprising a single memory unit; and
    the size of the memory unit in the dynamic memory group is greater than the size of each of the memory units in the static memory group.

4. The method according to claim 2, wherein the dividing the shared memory into a plurality of memory groups and a reserved memory comprises:
    dividing the shared memory into the memory groups and the reserved memory according to the amount of information received by the shared memory for the first time, the size of each memory unit in the memory groups being greater than the amount of the information received by the shared memory for the first time.

5. The method according to claim 1, wherein the reallocating a first memory unit suitable for the amount of the first information according to the reserved memory and an idle state of the memory unit in the dynamic memory group comprises:
    determining whether the memory unit in the dynamic memory group is idle; and
    if yes, acquiring the memory unit in the dynamic memory group, recombining the memory unit and the reserved memory, and allocating the first memory unit suitable for the amount of the first information; and
    if no, deleting the memory unit in the dynamic memory group, and allocating, from the reserved memory, the first memory unit suitable for the amount of the first information.

6. A system for transmitting information, comprising:
    at least one processor; and
    a memory storing instructions, which when executed by the at least one processor, cause the at least one processor to perform operations, the operations comprising:
    requesting a shared memory from an operating system;
    dividing the shared memory into memory groups and a reserved memory;
    sending first information to be transmitted to the shared memory;
    traversing the memory groups in the shared memory, and acquiring a first memory unit suitable for an amount of the first information, the memory groups comprising a static memory group and a dynamic memory group, each of the memory groups comprising at least one memory unit, each of the memory units in the memory group having an identical size, and the memory units in different memory groups having different sizes; and
    storing the first information into the acquired first memory unit, so that the first information is read from the first memory unit by a receiving node,
    wherein the traversing memory groups in the shared memory, and acquiring a first memory unit suitable for the amount of the first information comprises:
    traversing the memory groups in the shared memory, and determining whether there is a memory unit having the size larger than the amount of the first information in each of the memory groups; and
    if yes, acquiring, from the memory units having the sizes larger than the amount of the first information, a memory unit having a smallest size difference with the amount of the first information as the first memory unit; and
    if no, reallocating a first memory unit suitable for the amount of the first information according to the reserved memory and an idle state of the memory unit in the dynamic memory group.

7. The system according to claim 6, wherein the sizes of the memory units being greater than a preset threshold.

8. The system according to claim 7, wherein the dynamic memory group comprising a single memory unit; and
    the size of the memory unit in the dynamic memory group is greater than the size of each of the memory units in the static memory group.

9. The system according to claim 7, wherein the dividing the shared memory into a plurality of memory groups and a reserved memory comprises:
    dividing the shared memory into the memory groups and the reserved memory according to the amount of information received by the shared memory for the first time, the size of each memory unit in the memory groups being greater than the amount of the information received by the shared memory for the first time.

10. The system according to claim 6, wherein the reallocating a first memory unit suitable for the amount of the first information according to the reserved memory and an idle state of the memory unit in the dynamic memory group comprises:
  determining whether the memory unit in the dynamic memory group is idle; and
  if yes, acquiring the memory unit in the dynamic memory group, recombining the memory unit and the reserved memory, and allocating the first memory unit suitable for the amount of the first information; and
  if no, deleting the memory unit in the dynamic memory group, and allocating, from the reserved memory, the first memory unit suitable for the amount of the first information.

11. A non-transitory computer storage medium storing a computer program, which when executed by one or more computers, cause the one or more computers to perform operations, the operations comprising:
  requesting a shared memory from an operating system;
  dividing the shared memory into memory groups and a reserved memory;
  sending first information to be transmitted to the shared memory;
  traversing the memory groups in the shared memory, and acquiring a first memory unit suitable for an amount of the first information, the memory groups comprise a static memory group and a dynamic memory group, each of the memory groups comprising at least one memory unit, each of the memory units in the memory group having an identical size, and the memory units in different memory groups having different sizes; and
  storing the first information into the acquired first memory unit, so that the first information is read from the first memory unit by a receiving node;
  wherein the traversing memory groups in the shared memory, and acquiring a first memory unit suitable for the amount of the first information comprises:
  traversing the memory groups in the shared memory, and determining whether there is a memory unit having the size larger than the amount of the first information in each of the memory groups; and
  if yes, acquiring, from the memory units having the sizes larger than the amount of the first information, a memory unit having a smallest size difference with the amount of the first information as the first memory unit; and
  if no, reallocating a first memory unit suitable for the amount of the first information according to the reserved memory and an idle state of the memory unit in the dynamic memory group.

12. The non-transitory computer storage medium according to claim 11, wherein the sizes of the memory units being greater than a preset threshold.

13. The non-transitory computer storage medium according to claim 12, wherein the dynamic memory group comprising a single memory unit; and
  the size of the memory unit in the dynamic memory group is greater than the size of each of the memory units in the static memory group.

14. The non-transitory computer storage medium according to claim 12, wherein the dividing the shared memory into a plurality of memory groups and a reserved memory comprises:
  dividing the shared memory into the memory groups and the reserved memory according to the amount of information received by the shared memory for the first time, the size of each memory unit in the memory groups being greater than the amount of the information received by the shared memory for the first time.

15. The non-transitory computer storage medium according to claim 11, wherein the reallocating a first memory unit suitable for the amount of the first information according to the reserved memory and an idle state of the memory unit in the dynamic memory group comprises:
  determining whether the memory unit in the dynamic memory group is idle; and
  if yes, acquiring the memory unit in the dynamic memory group, recombining the memory unit and the reserved memory, and allocating the first memory unit suitable for the amount of the first information; and
  if no, deleting the memory unit in the dynamic memory group, and allocating, from the reserved memory, the first memory unit suitable for the amount of the first information.

* * * * *